US011727473B2

(12) United States Patent
Faigin

(10) Patent No.: US 11,727,473 B2
(45) Date of Patent: Aug. 15, 2023

(54) METHODS, DEVICES, AND SYSTEMS FOR PURCHASING DECISIONS BASED ON SOCIAL COLLABORATION

(71) Applicant: Little Caesar Enterprises, Inc., Detroit, MI (US)

(72) Inventor: Keith Faigin, Detroit, MI (US)

(73) Assignee: Little Caesar Enterprises, Inc., Detroit, MI (US)

( * ) Notice: Subject to any disclaimer, the term of this patent is extended or adjusted under 35 U.S.C. 154(b) by 0 days.

(21) Appl. No.: 16/639,290

(22) PCT Filed: Aug. 15, 2018

(86) PCT No.: PCT/US2018/000252
§ 371 (c)(1),
(2) Date: Feb. 14, 2020

(87) PCT Pub. No.: WO2019/035977
PCT Pub. Date: Feb. 21, 2019

(65) Prior Publication Data
US 2020/0258142 A1 Aug. 13, 2020

Related U.S. Application Data

(60) Provisional application No. 62/545,805, filed on Aug. 15, 2017.

(51) Int. Cl.
*G06Q 30/00* (2023.01)
*G06Q 30/0601* (2023.01)
(Continued)

(52) U.S. Cl.
CPC ....... *G06Q 30/0641* (2013.01); *G06Q 20/384* (2020.05); *G06Q 30/0635* (2013.01); *G06Q 50/12* (2013.01)

(58) Field of Classification Search
CPC ..... G06Q 30/0601–0645; G06Q 30/08; G06Q 30/0633; G06Q 30/0635; G06Q 30/0641; G06Q 20/384; G06Q 50/12
(Continued)

(56) References Cited

U.S. PATENT DOCUMENTS 8,331,912 B1 * 12/2012 Lundy ............... H04W 4/12 455/72
9,070,175 B2 * 6/2015 Hurst ................ G06Q 50/12
(Continued)

FOREIGN PATENT DOCUMENTS

CN 103930916 A 7/2014
CN 105096016 A 11/2015
(Continued)

OTHER PUBLICATIONS

Pizza, Domino's. "Domino's Pizza® Launches New Online Group Ordering Tool." CISION, Jun. 30, 2018, www.prnewswire.com/news-releases/dominos-pizza-launches-new-online-group-ordering-tool-258881071.html.*
(Continued)

*Primary Examiner* — Michael Misiaszek
*Assistant Examiner* — Lindsey B Smith
(74) *Attorney, Agent, or Firm* — Honigman LLP

(57) ABSTRACT

A method for purchasing based on social collaboration is provided. The method includes receiving primary customer order information and executing a collaborative pizza ordering application having an order initiation window and collaborative order window associated with at least one menu item order. The order initiation window has a list of at least one contact and at least one communication channel. The collaborative order window has a response summary of the at least one contact. The collaborative pizza ordering application is configured to: receive at least one contact selection
(Continued)

input of the list; receive at least one communication channel selection input of the at least one communication channel; display the response summary corresponding to at least one social response from the at least one secondary customer and at least one proposed order; and communicate a social order comprising the at least one secondary customer and the at least one communication channel.

26 Claims, 7 Drawing Sheets

(51) Int. Cl.
  *G06Q 20/38* (2012.01)
  *G06Q 50/12* (2012.01)
(58) Field of Classification Search
  USPC .................................. 705/26.1–27.2
  See application file for complete search history.

(56) References Cited

U.S. PATENT DOCUMENTS

| | | | | |
|---|---|---|---|---|
| 2007/0203801 A1* | 8/2007 | Istfan | ............ | G06Q 50/12 705/26.1 |
| 2008/0082420 A1* | 4/2008 | Kargman | ............ | G06Q 30/02 705/14.27 |
| 2009/0167553 A1 | 7/2009 | Hong et al. | | |
| 2012/0036028 A1* | 2/2012 | Webb | ............ | G06Q 30/06 705/15 |
| 2013/0151357 A1* | 6/2013 | Havas | ............ | G06Q 50/12 705/15 |
| 2013/0151425 A1* | 6/2013 | Feinstein | ............ | G06F 40/20 704/9 |
| 2014/0222547 A1* | 8/2014 | Pridmore | ............ | G06Q 30/02 705/14.39 |
| 2014/0278862 A1 | 9/2014 | Muppala | | |
| 2014/0330739 A1 | 11/2014 | Falcone et al. | | |
| 2015/0025991 A1* | 1/2015 | Shaw | ............ | G06Q 30/0605 705/26.2 |
| 2015/0379651 A1* | 12/2015 | Hurst | ............ | G06Q 30/0641 705/15 |
| 2016/0012513 A1* | 1/2016 | Martinez | ............ | G06Q 30/0631 705/15 |
| 2018/0205679 A1* | 7/2018 | Melzer | ............ | G06Q 30/0635 |
| 2018/0293601 A1* | 10/2018 | Glazier | ............ | G06Q 30/0214 |

FOREIGN PATENT DOCUMENTS

| | | |
|---|---|---|
| CN | 105814595 A | 7/2016 |
| CN | 106576070 A | 4/2017 |

OTHER PUBLICATIONS

Filloon, Whitney, Taco Bell Launches Ordering via Slack, Workaholics Rejoice, Apr. 6, 2016, eater.com, accessed at [https://www.eater.com/2016/4/6/11377826/taco-bell-slack-ordering] (Year: 2016).*

International Search Report dated Nov. 1, 2018, relating to International Application No. PCT/US2018/00252.

Extended European Search Report dated Nov. 16, 2020, relating to EP Application No. 18846213.9.

European Patent Office, Office Action for Application No. 18846213.9 dated Feb. 7, 2022.

China Patent Office, First Office Action for Application No. 201880062517 X dated Mar. 11, 2023.

* cited by examiner

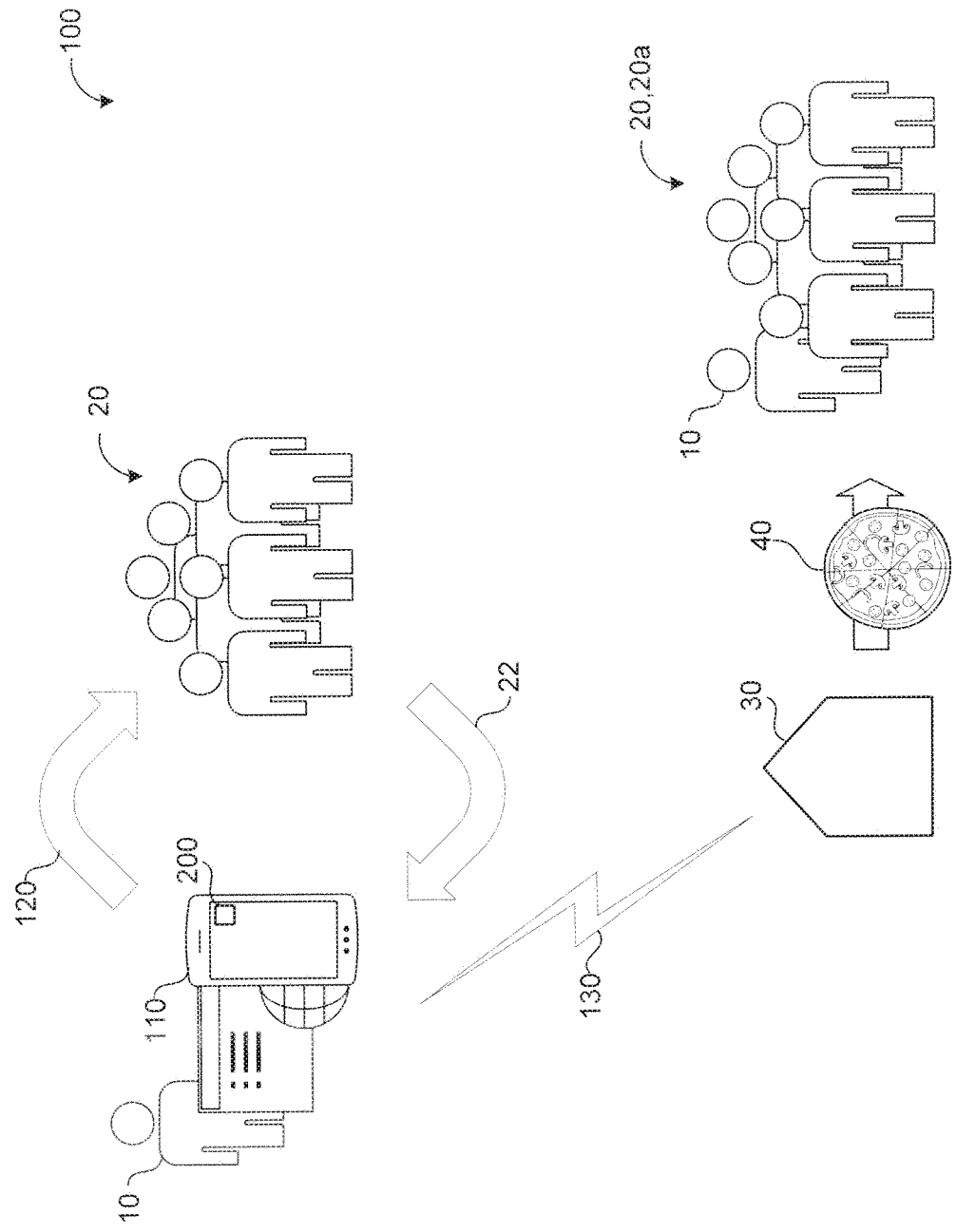

METHODS, DEVICES, AND SYSTEMS FOR PURCHASING DECISIONS BASED ON SOCIAL COLLABORATION

TECHNICAL FIELD

This disclosure relates to coordinating purchasing decisions and more particularly to a pizza retailer order based on social collaboration.

BACKGROUND

Applications are types of software typically developed to streamline particular functionality. For example, mobile applications, unlike integrated software systems, have isolated or limited software functionality to streamline compatibility with the mobile devices. Applications may take into account device features, such as size, shape, hardware (e.g., processing speed and memory), communication capability (e.g., wireless connections, mobile data, global positioning, etc.) or electronic device user information. The design of applications may vary depending on whether the application is designed for a mobile device system, a web-based system that communicates via the Internet and stores content on a remote server, or a hybrid application that combines native and web-based application elements. With popular applications today, the electronic device user may perform a wide array of lifestyle functions, such as navigation, communication with friends, organization of finances, arrangement of transit, and acquisition of goods and services.

Today electronic device users have vast amounts of computing power at their fingertips especially with portable electronics and mobile devices. With this computing power, the retail industry has transformed shopping into a virtual experience. The device user may shop, place an order, and await delivery without traveling to a brick-and-mortar store. Electronic devices have brought a level of convenience to users that eliminates time spent waiting in line, traveling, or ordering goods and services at a point of sale. Electronic devices also allow increased collaboration as networks of people are interconnected. With this interconnectivity, social media has flourished and allowed users to virtually participate in each other's lives. While known systems and methods of purchasing decisions based on social collaboration have proven acceptable for their intended purpose, a continuous need for improvement in the relevant art remains.

SUMMARY

One aspect of the disclosure provides a method for collaborative pizza ordering. The method includes receiving, at data processing hardware, primary customer order information and executing, at the data processing hardware, a collaborative pizza ordering application configured to display on a display screen in communication with the data processing hardware a graphical user interface having an order initiation window and collaborative order window associated with at least one menu item order. The order initiation window has a list of at least one contact and at least one communication channel corresponding order window having a response summary of the at least one contact. The collaborative pizza ordering application is configured to receive, in the order initiation window, at least one contact selection input of the list of the at least one contact, the at least one contact selection input defining at least one secondary customer. The application is also configured to receive, in the order initiation window, at least one communication channel selection input of the at least one communication channel, the at least one communication channel selection input defining the at least one communication channel to contact the at least one secondary customer. The application is further configured to display, in the collaborative order window, the response summary corresponding to at least one social response from the at least one secondary customer and at least one proposed menu item order and communicate, from the graphical user interface, a social order, the social order comprising the at least one secondary customer and the at least one communication channel.

Implementations of the disclosure may include one or more of the following optional features. In some implementations, the social order includes primary customer order information. The collaborative pizza ordering application may be further configured to receive, in the graphical user interface, a notification corresponding to at least one social response from the at least one contact. The application may also be configured to receive, in the order initiation window, a custom message from a primary customer. The social order may also include the custom message from the primary customer.

In some examples, the collaborative pizza ordering application is configured to receive, in the graphical user interface, at least one menu item order corresponding to the proposed menu item order and communicate, from the graphical user interface, the at least one menu item order. The application may be further configured to display, in the collaborative order window, the response summary received from an order management engine with order management processing hardware. The order management processing hardware may be configured to: receive the social order; communicate the social order to the at least one secondary customer according to the at least one communication channel; and receive at least one social response related to the social order from the at least one secondary customer. The at least one social response may be defined by natural language. For each secondary customer of the at least one secondary customer, the order management processing hardware may be configured to: identify at least one order preference based on the natural language of the at least one social response; determine a proposed order corresponding to the at least one order preference; and communicate the proposed order to the collaborative pizza ordering application. Communicating the proposed order may include communicating each of the at least one social response.

Another aspect of the disclosure provides a user device including a display screen, data processing hardware in communication with the display screen and memory hardware in communication with the data processing hardware. The memory hardware stores instructions that when executed on the data processing hardware cause the data processing hardware to perform operations. The operations include receiving primary customer order information and executing a collaborative pizza ordering application configured to display on the display in communication with the data processing hardware a graphical user interface having an order initiation window and collaborative order window associated with at least one menu item order. The order initiation window has a list of at least one contact and at least one communication channel corresponding to each contact related to the list of the at least one contact. The collaborative order window has a response summary of the at least one contact. The collaborative pizza ordering application is configured to receive, in the order initiation window, at least one contact selection input of the list of the at least one contact, the at least one contact selection input defining at least one secondary customer. The application is also configured to receive, in the order initiation window, at least one communication channel selection input of the at least one communication channel. The at least one communication channel selection input defines the at least one communication channel to contact the at least one secondary customer. The application is further configured to display, in the collaborative order window, the response summary corresponding to at least one social response from the at least one secondary customer and at least one proposed order and communicate, from the graphical user interface, a social order. The social order includes the at least one secondary customer and the at least one communication channel.

This aspect may include one or more of the following optional features. In some implementations, the social order includes primary customer order information. The collaborative pizza ordering application may also be configured to receive, in the graphical user interface, a notification corresponding to at least one social response from the at least one contact. The application may be further configured to receive, in the order initiation window, a custom message from a primary customer. The social order may include the custom message from the primary customer.

In some examples, the collaborative pizza ordering application is configured to: receive, in the graphical user interface, at least one menu item order corresponding to the proposed order; and communicate, from the graphical user interface, the at least one menu item order. The application may also be configured to display, in the collaborative order window, the response summary received from an order management engine with order management processing hardware. The order processing hardware may be configured to: receive the social order; communicate the social order to the at least one secondary customer according to the at least one communication channel; and receive at least one social response related to the social order from the at least one secondary customer. The at least one social response may be defined by natural language. For each secondary customer of the at least one secondary customer, the order management processing hardware may be configured to: identify at least one order preference based on the natural language of the at least one social response; determine a proposed order corresponding to the at least one order preference; and communicate the proposed order to the collaborative pizza ordering application. Communicating the proposed order may include communicating each of the at least one social response.

Yet another aspect of the disclosure provides a method for proposing a collaborative pizza order. The method includes receiving, at data processing hardware, a social order, the social order defined by at least one secondary customer and at least one communication channel corresponding to the at least one secondary customer, the at least one secondary customer and the at least one communication channel identified by a primary customer. The method also includes communicating, from the data processing hardware, the social order to the at least one secondary customer according to the at least one communication channel and receiving, at the data processing hardware, at least one social response related to the social order from the at least one secondary customer. The at least one social response is defined by natural language. For each secondary customer of the at least one secondary customer, the method includes: identifying, by the data processing hardware, at least one order preference based on the natural language of the at least one social response; determining, by the data processing hardware, a proposed order corresponding to the at least one order preference; and communicating, from the data processing hardware, the proposed order.

This aspect may include one or more of the following optional features. In some implementations, the social order includes a custom message from the primary customer. Communicating the proposed order may also include communicating each of the at least one social response. The method may also include storing the proposed order in memory hardware.

Yet another aspect of the disclosure provides a system including data processing hardware and memory hardware in communication with the data processing hardware. The memory hardware stores instructions that when executed on the data processing hardware cause the data processing hardware to perform operations. The operations include receiving a social order, the social order defined by at least one secondary customer and at least one communication channel corresponding to the at least one secondary customer, the at least one secondary customer and the at least one communication channel identified by a primary customer. The operations also include communicating the social order to the at least one secondary customer according to the at least one communication channel and receiving at least one social response related to the social order from the at least one secondary customer, the at least one social response defined by natural language. For each secondary customer of the at least one secondary customer, the operations include: identifying at least one order preference based on the natural language of the at least one social response; determining a proposed order corresponding to the at least one order preference; and communicating the proposed order.

This aspect may include one or more of the following optional features. In some implementations, the social order includes a custom message from the primary customer. The proposed order may include each of the at least one social response. The operations may also include storing the proposed order in memory hardware.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 1A and 1B are schematic views of an example collaborative order environment.

Like reference symbols in the various drawings indicate like elements.

DETAILED DESCRIPTION

Figure 1B:
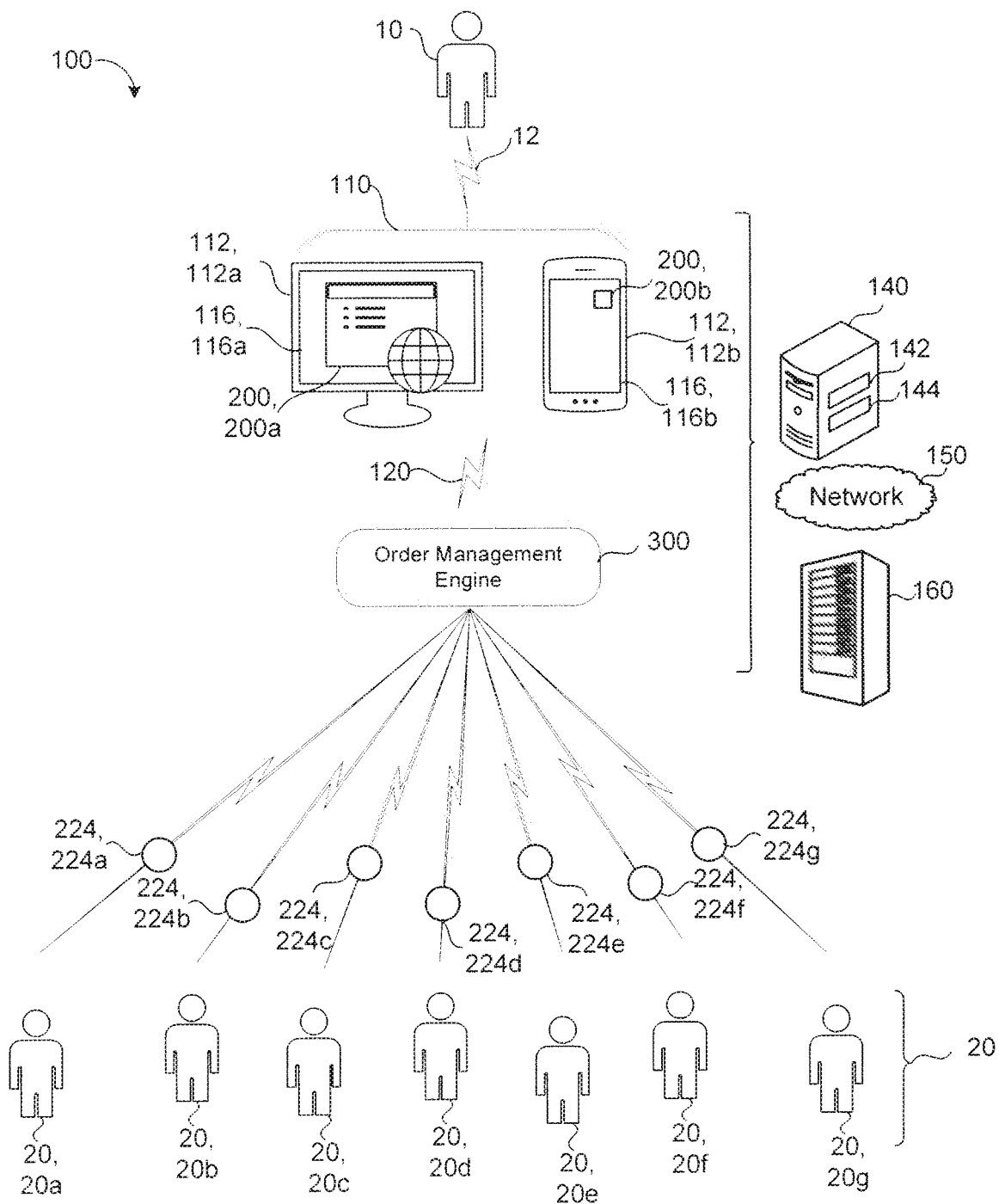

FIGS. 1A and 1B are examples of a collaborative order environment 100. Referring to FIG. 1A, the collaborative order environment 100 generally includes a primary customer 10, at least one secondary customer 20, a pizza retailer 30, and an ordering system 110. The primary customer 10 is an entity that initializes a social order 120 for at least one menu item of the pizza retailer 30. Often, the at least one menu item of the pizza retailer 30 may relate to at least one pizza 40; therefore, for purposes of this disclosure the at least one menu item and a corresponding at least one menu item order from the pizza retailer 30 is described herein with reference to at least one pizza 40 and at least one pizza order 130, respectfully. Generally, the social order 120 is a conversation assessing interests or preferences of at least one secondary customer 20, such as friends, family, coworkers, colleagues, teammates, guests etc., to generate at least one pizza order 130. For example, the social order 120 may range from minimally gaging interest to gathering preferences (e.g., menu items, toppings, level of hunger, potential guests, etc.) from at least one interested secondary customer 20, 20i. The primary customer 10 initiates the social order 120 with the ordering system 110 and requests inclusion in a pizza order decision making process from at least one secondary customer 20. To initiate the social order 120, the primary customer 10 identifies at least one secondary customer 20 through a collaborative pizza ordering application 200. Each secondary customer 20, 20i-n of the at least one secondary customer 20 generates at least one social response 22 related to the social order 120. With the at least one social response 22, the primary customer 10 generates at least one pizza order 130 and communicates the at least one pizza order 130 to the pizza retailer 30. The pizza retailer 30 produces at least one pizza 40 corresponding to the at least one pizza order 130 for the primary customer 10 and the at least one interested secondary customer 20, 20i.

Referring to FIG. 1B, the primary customer 10 may access the collaborative pizza ordering application 200 via an ordering system 110 related to a host device 112, such as a personal computer 112, 112a, a mobile device 112, 112b, or other computing device capable of hosting the collaborative pizza ordering application 200. Depending on the host device 112, the collaborative pizza ordering application 200 may be a web-based application 200, 200a (e.g., for the personal computer 112, 112a) or a mobile application 200, 200b (e.g., for the mobile device 112, 112b). The primary customer 10 may be a first-time user 10, 10a (i.e. guest or unknown user) or a known user 10, 10b of the collaborative pizza ordering application 200. If the primary customer 10 is a first-time user 10, 10a, the collaborative pizza ordering application 200 may prompt the primary customer 10 to enter primary customer order information 12. Some examples of primary customer order information 12 are full name, address, telephone number, email, social media accounts, credit card information, etc. Additionally or alternatively, the collaborative pizza ordering application 200 prompts the primary user 10 for permission to access and/or to locate at least one contact 114 related to the primary customer 10 within the host device 112. For example, the primary customer 10 has contacts 114 stored within address books, email accounts, and social media accounts (e.g., facebook, snapchat, twitter, instagram, etc.) on the host device 112. If the primary customer 10 is a known user 10, 10b the collaborative pizza ordering application 200 may have already received access to contacts 114 within the host device 112 or may request updated permissions. For a known user 10, 10b, the collaborative pizza ordering application 200 may have already stored primary customer order information 12 (e.g., within an account of the primary customer 10).

Referring further to FIG. 1B, the collaborative pizza ordering application 200 of the ordering system 110 communicates the social order 120 to an order management engine 300. The social order 120 from the ordering system 110 identifies the at least one contact 114 relating to at least one secondary customer 20 and at least one communication channel 224. For example, the at least one communication channel 224 is short message service text (i.e. SMS text), email, instagram, snapchat, facebook messenger, gchat, voice assistance, or any other language based communication mechanism. The order management engine 300 communicates with each secondary customer 20, 20a-g of the at least one secondary customer designated by the primary customer 10 in the social order 120 via a corresponding at least one communication channel 224, 224a-g. For example, the order management engine 300 communicates with the secondary customer 20, 20a via communication channel 224, 224a. Based on the social response 22 of the secondary customer 20, the order management engine 300 provides a proposed order 326 to the primary customer 10.

With continued reference to FIG. 1B, the ordering system 110 and/or order management engine 300 of the collaborative order environment 100 includes a processing system 140 with data processing hardware 142 and memory hardware 144. In some implementations, the data processing hardware 142 and/or the memory hardware 144 are in communication with a network 150 associated with a server 160.

Figure 2:
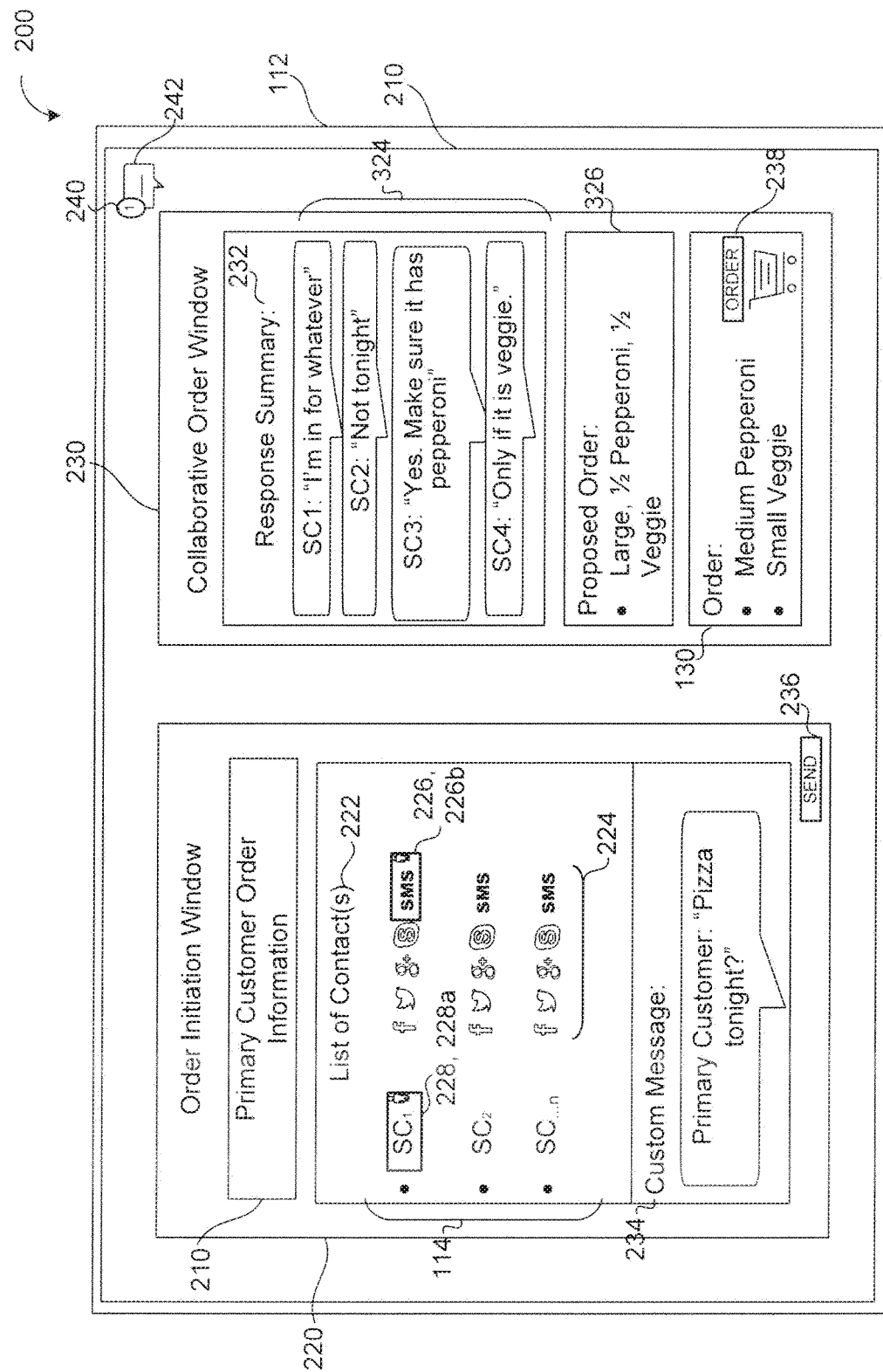
FIG. 2 is a schematic view of an example collaborative pizza ordering application for an ordering system.

FIG. 2 is an example of a collaborative pizza ordering application 200. The collaborative pizza ordering application 200 is configured to display a graphical user interface 210 on a display screen 116. The graphical user interface 210 includes an order initiation window 220 where the primary customer 10 initiates the social order 120 and collaborative order window 230 configured to display social responses 22 related to the social order 120. The order initiation window 220 has a list 222 of at least one contact 114 and at least one communication channel 224 corresponding to each contact 114 of the at least one contact 114 of the list 222. Each contact 114 of the list 222 corresponds to a secondary customer 20. The collaborative order window 230 includes a response summary 232 of the at least one contact 114 and the at least one proposed order 326 received from the order management engine 300. In some examples, the collaborative order window 230 also includes the at least one pizza order 130 relating to the at least one proposed order 326.

The order initiation window 220 of the collaborative pizza ordering application 200 is configured to receive at least one selection input 226. The at least one selection input 226 may be an at least one contact selection input 226, 226a and/or an at least one communication channel selection input 226, 226b. The at least one contact selection input 226, 226a is a selection of at least one contact 114 from the list 222 in the order initiation window 220. The at least one contact selection input 226, 226a defines at least one secondary customer 20 that the primary customer 10 wishes to include in the at least one pizza order 130. The at least one communication channel selection input 226, 226b selects at least one communication channel 224. The at least one communication channel selection input 226, 226b defines the at least one communication channel 224 to contact the at least one secondary customer 20. In some examples, a contact 114 of the list 222 corresponding to a secondary customer 20 may be accessible by more than one communication channel 223. For example, as depicted in FIG. 2, each contact 114 is accessible by Facebook messenger, twitter, gchat via google plus, skype, or SMS text. In some implementations, a selected contact defined according to the at least one contact selection input 226, 226a may be contacted via more than one communication channel 224 such that the collaborative pizza ordering application 200 receives more than one communication channel selection input 226, 226b corresponding to the selected contact 114, 114s. Based on the at least one contact selection input 226, 226a and the at least one communication channel selection input 226, 226b, the collaborative pizza ordering application 200 communicates the social order 120 to the at least one secondary customer 20. In some examples, social order 120 may include additional details such as the primary customer order information 12 or a custom message 234 from the primary customer 10. For example, the primary customer 10 may type or dictate the custom message 234 in the order initiation window 220. In other examples, the custom message 234 may be received by the collaborative pizza ordering application 200 in a different window than the order initiation window 220.

In some examples, the collaborative pizza ordering application 200 is further configured to receive a notification 240 regarding the receipt of at least one social response 22 from a secondary customer 20 or a proposed order 326 from the order management engine 300. For example, FIG. 2 illustrates that the collaborative pizza ordering application 200 has received a notification 240 by a numeric designation in the upper left hand corner of a notification icon 242. Selection of a notification icon 242 indicating a notification 240 may initiate the collaborative order window 230 such that the graphical user interface 210 displays the collaborative order window 230.

Referring further to FIG. 2, the collaborative pizza ordering application 200 is configured to display the collaborative window 230. The collaborative pizza ordering application 200 may receive the response summary 232 corresponding to at least one social response 22 of the at least one contact 114 from the order management engine 300. The response summary 232 may include a textual representation of each social response 22 from each selected contact 114, 114s defined by the at least one contact selection input 226, 226a. The collaborative pizza ordering application 200 also displays, in the collaborative order window 230, the proposed order 326 determined by the order management engine 300. In some examples, the collaborative pizza ordering application 200 also is configured to display at least one pizza order 130 relating to the proposed order 326. The collaborative pizza ordering application 200 may receive modification to the proposed order 326 to generate the pizza order 130. For example, FIG. 2 shows an example of a pizza order 130 that has been modified from the proposed order 326. Modifications may occur because the primary customer 10 understands pizza habits of the at least one secondary customer 20 or disagrees with an inclusion of at least one order preference 322 determined by the order management engine 300 from the at least one social response 22. The pizza order 130 may be displayed in the collaborative order window 230 or a different window within the graphical user interface 210 of the collaborative pizza ordering application 200.

Additionally or alternatively, the collaborative pizza ordering application 200 may include icons (e.g., 236-242) to facilitate efficient and effective placement of the pizza order 130. For example, the order initiation window 220 includes a send icon 236 that upon selection of the send icon 236 transmits the social order 120. Similarly, the collaborative order window 230 includes an order icon 238 that upon selection of the order icon 238 transmits the at least one pizza order 130 to the pizza retailer 30. Each of these icons may also be displayed in a different window of the collaborative pizza ordering application 200.

With continuing reference to FIG. 2, FIG. 2 illustrates a collaborative order window 230 with a response summary 232 from four secondary customers 20, 20a-d. The response summary 232 is a display of a text summary 324 provided by the order management engine 300. In this example, one secondary customer SC1 is unconditionally interested in a pizza order 130, while two secondary customers SC3 and SC4 are conditionally interested (e.g., conditioned on pepperoni and veggies). The fourth secondary customer SC2 is not interested. From these social responses 22, the order management engine 300 communicates a proposed order 326 of a large pizza with half pepperoni and half veggie to the collaborative pizza ordering application 200. With this proposed order 326, the primary customer 10 has modified the proposed order 326 to a pizza order 130 of a medium pepperoni pizza and a small veggie pizza.

Figure 3:
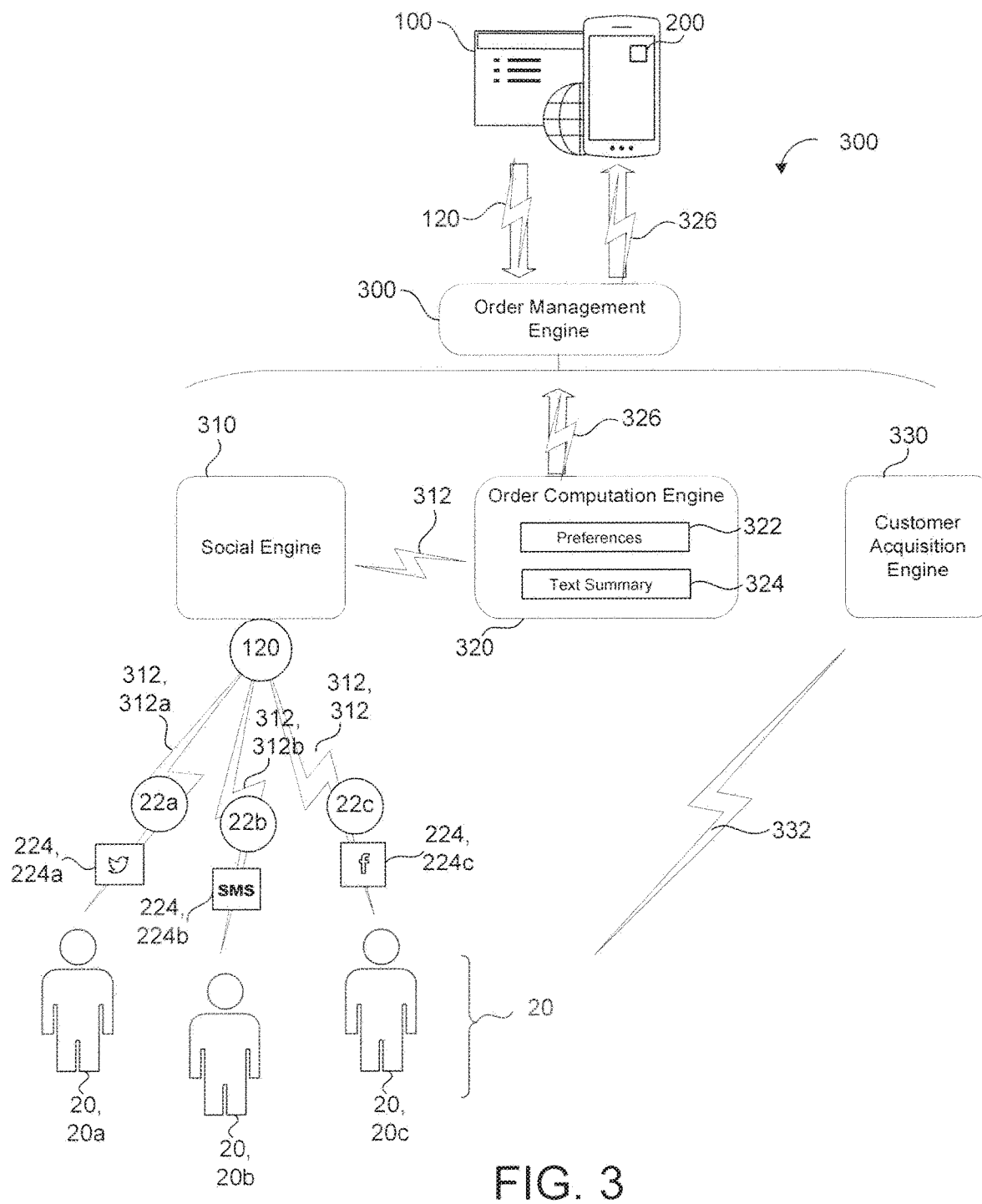
FIG. 3 is a schematic view of an example order management engine interacting with an ordering system.

FIG. 3 is an example of an order management engine 300. The order management engine 300 includes a social engine 310 and an order computation engine 320. The order management engine 300 receives the social order 120 from the collaborative pizza ordering application 200. Based on the collaborative pizza ordering application 200, the order management engine 300 engages the social engine 310 to initiate communication of the social order 120 with each secondary customer 20 designated by the social order 120 according to the at least one contact selection input 226, 226a from the list 222 of the at least one contact 114. The at least one contact selection input 226, 226a defines a selected secondary customer (e.g., 20, 20a-c). The social engine 310 communicates with each selected secondary customer 20, 20a-c by at least one communication channel 224 corresponding to at least one communication channel selection input 226, 226b also designated in the social order 120. The social engine 310 receives at least one social response 22 (e.g., 22a-c). In some examples, when the social engine 310 fails to receive a social response 22 from a secondary customer 20, the social engine 310 stores a default social response indicating the secondary customer 20 is not interested in a pizza order 130. In some implementations, the social engine 310 is configured to ask a sequence of questions to each secondary customer 20 designated by the social order 120. For example, the social engine 310 may determine whether each secondary customer 20 is interested in participating in a pizza order 130 and if so, inquire about order preferences 322 of each secondary customer 20. The social engine 310 compiles each social response 22 (e.g., 22a-c) along with chat information 312 (e.g., 312, 312a-c) and communicates one or both to the order computation engine 320. Chat information 312 may include interest in a pizza, menu item preferences, specialty requests (e.g., veggies only, gluten free), interested third parties, count of interested secondary customers, etc. In some examples, the at least one social response 22 is defined by natural language. The social engine 310 may be an off-the-shelf ChatBot (e.g., Kore) or a proprietary program.

The order computation engine 320 is configured to identify at least one order preference 322 for each secondary customer 20 (e.g., 20a-c) of the at least one secondary customer 20 designated by the social order 120. The order computation engine 320 may use natural language processing to determine at least one order preference 322. Based on the at least one order preference 322 related to the chat information 312 and/or the at least one social response 22, the order computation engine 320 compiles a text summary 324. With the text summary 324, the order computation engine 320 determines a proposed order 326. Alternatively, the computation engine 320 may determine the proposed order 326 from the at least one order preference 322 without compiling the text summary 324. The order computation engine 320 communicates the proposed order 326 to the order management engine 300 or directly to the collaborative pizza ordering application 200.

Additionally or alternatively, the order management engine 300 includes a customer acquisition engine 330. The customer acquisition engine 330 identifies whether the at least one secondary customer 20 corresponding to the social order 120 is a known user 10, 10b or an unknown user 10, 10a. If the at least one secondary customer 20 is known user 10, 10b, the customer acquisition engine 330 may store order preferences 322 related to the known user 10, 10b. For example, the known user 10, 10b may have an existing customer profile or account with the collaborative pizza ordering application 200 and the order management engine 300 via the customer acquisition engine 330 may associate order preferences 322 with the known user 10, 10b whenever the known user 10, 10b participates in a social order 120 as either the primary customer 10 or the secondary customer 20. The customer acquisition engine 330 may also track and/or associate the value of a pizza order 130 related to a social order 120 with an account of a known user 10, 10b whenever the known user 10, 10b participates in a social order 120 as either the primary customer 10 or the secondary customer 20. In some examples, based on participation in a social order 120, the customer acquisition engine 330 may credit a known user 10, 10b with coupons, discounts, or other rewards. On the other hand, if the at least one secondary customer 20 is an unknown user 10, 10a, the customer acquisition engine 330 may store chat information 312 related to the unknown user 10, 10a along with the corresponding communication channel 224 of the unknown user 10, 10a as new customer identification 332. The customer acquisition engine 330 may additionally be configured to generate advertisements or other incentives, such as discounts, coupons, or other value rewards, for the unknown user 10, 10a using the corresponding communication channel 224 of the unknown user 10, 10a. In some instances, the customer acquisition engine 330 retroactively associates order preferences 322 and/or value of a pizza order 130 related to a social order 120 with an account created by an unknown user 10, 10b previously stored by the new customer identification 332.

Additionally or alternatively, the social engine 310 may communicate details regarding if and/or when a pizza order 130 related to a social order 120 was sent to the pizza retailer 30. In some examples, the social engine 310 only communicates details of a pizza order 130 to secondary customers 20 who expressed interest in a pizza order 130 by a social response 22. Optionally, the social engine 310 communicates details of a pizza order 130 to all secondary customers 20 designated by a social order 120.

Figure 4:
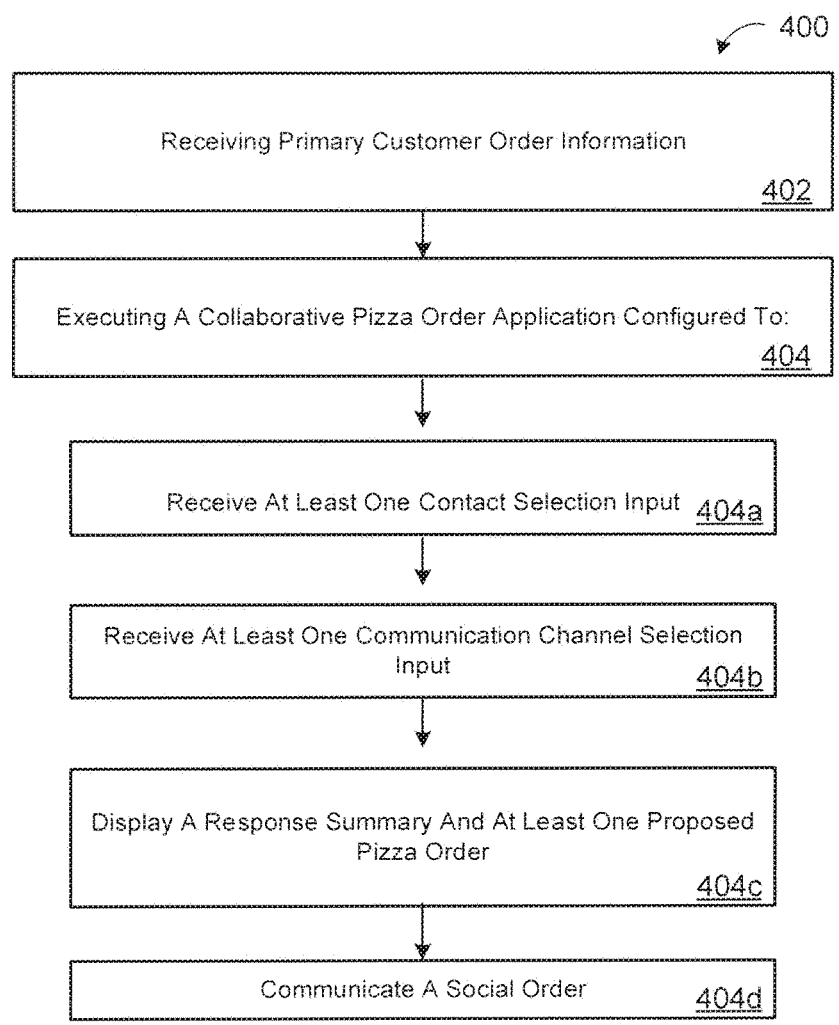
FIG. 4 is an example flow diagram of a collaborative pizza ordering application within a collaborative order environment.

FIG. 4 illustrates a method 400 for collaborative pizza ordering. At block 402, the method 400 includes receiving, at data processing hardware, primary customer order information (12). At block 404, the method 400 includes executing, at the data processing hardware, a collaborative pizza ordering application 200 configured to display on a display screen 116 in communication with the data processing hardware a graphical user interface 210 having an order initiation window 220 and collaborative order window 230 associated with at least one pizza order 130. The order initiation window 220 has a list 222 of at least one contact 114 and at least one communication channel 224 corresponding to each contact 114 related to the list 222 of the at least one contact 114. The collaborative order window 230 has a response summary 232 of the at least one contact 114. The collaborative pizza ordering application 200 is configured to receive, in the order initiation window 220, at least one contact selection input 226a of the list 222 of the at least one contact 114, the at least one contact selection input 226a defining at least one secondary customer 20. The application 200 is also configured to receive, in the order initiation window 220, at least one communication channel selection input 226a of the at least one communication channel 224, the at least one communication channel selection input 226b defining the at least one communication channel 224 to contact the at least one secondary customer 20. The application 200 is further configured to display, in the collaborative order window 230, the response summary 232 corresponding to at least one social response 22 from the at least one secondary customer 20 and at least one proposed order 326 and communicate, from the graphical user interface 210, a social order 120, the social order 120 comprising the at least one secondary customer 20 and the at least one communication channel 224.

In some implementations, the social order 120 includes primary customer order information 12. The collaborative pizza ordering application 200 may be further configured to receive, in the graphical user interface 210, a notification 240 corresponding to at least one social response 22 from the at least one contact 114. The application 200 may also be configured to receive, in the graphical user interface 210, a notification 240 corresponding to at least one social response 22 from the at least one contact 114. The application 200 may be further configured to receive, in the order initiation window 220, a custom message 234 from a primary customer 10. The social order 120 may also include the custom message 234 from the primary customer 10.

In some examples, the collaborative pizza ordering application 200 is configured to receive, in the graphical user interface 210, at least one pizza order 130 corresponding to the proposed order 326 and communicate, from the graphical user interface 210, the at least one pizza order 130. The application 200 may be further configured to display, in the collaborative order window 230, the response summary 232 received from an order management engine 300 with order management processing hardware. The order management processing hardware may be configured to: receive the social order 120; communicate the social order 120 to the at least one secondary customer 20 according to the at least one communication channel 224; and receive at least one social response 22 related to the social order 120 from the at least one secondary customer 20. The at least one social response 22 may be defined by natural language. For each secondary customer 20 of the at least one secondary customer 20, the order management processing hardware may be configured to: identify at least one order preference 322 based on the natural language of the at least one social response 22; determine a proposed order 326 corresponding to the at least one order preference 322; and communicate the proposed order 326 to the collaborative pizza ordering application 200. Communicating the proposed order 326 may include communicating each of the at least one social response 22.

Figure 5:
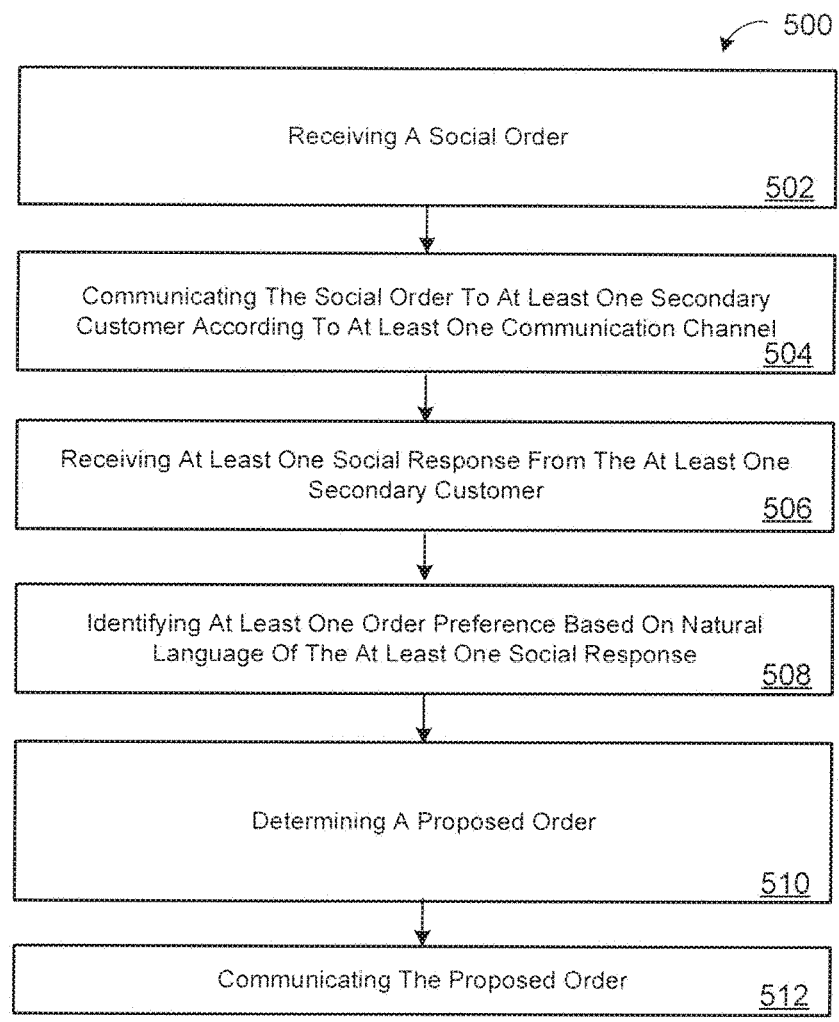
FIG. 5 is an example flow diagram of an order management engine performing operations for a collaborative pizza ordering application.

FIG. 5 illustrates a method 500 for proposing a collaborative pizza order. At block 502, the method 500 includes receiving, at data processing hardware, a social order 120. The social order 120 is defined by at least one secondary customer 20 and at least one communication channel 224 corresponding to the at least one secondary customer 20, the at least one secondary customer 20 and the at least one communication channel 224 identified by a primary customer 10. At block 504, the method 500 also includes communicating, from the data processing hardware, the social order 120 to the at least one secondary customer 20 according to the at least one communication channel 224. At block 506, the method 500 includes receiving, at the data processing hardware, at least one social response 22 related to the social order 120 from the at least one secondary customer 20. The at least one social response 22 is defined by natural language. For each secondary customer 20 of the at least one secondary customer 20, at block 506, the method 500 includes: identifying, by the data processing hardware, at least one order preference 322 based on the natural language of the at least one social response 22. At block 508, the method 500 includes determining, by the data processing hardware, a proposed order 326 corresponding to the at least one order preference 322. At block 510, the method 500 includes communicating, from the data processing hardware, the proposed order 326.

In some implementations, the social order 120 includes a custom message 234 from the primary customer 10. Communicating the proposed order 326 may also include communicating each of the at least one social response 22. The method 500 may also include storing the proposed order 326 in memory hardware.

Figure 6:
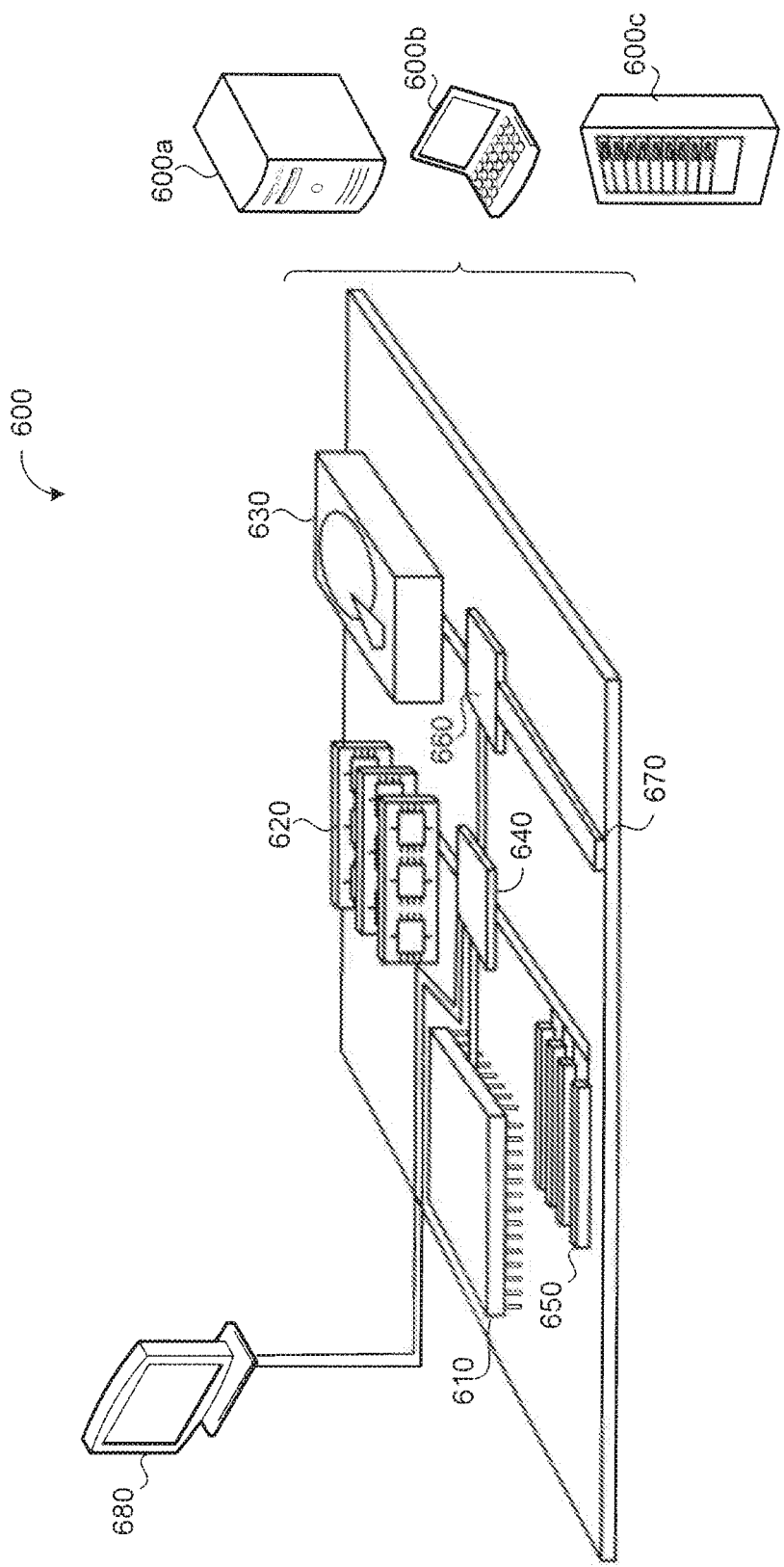
FIG. 6 is a schematic view of an example computing device that may be used to implement the systems and the methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, primary customer order information of a primary customer; and
   executing, at the data processing hardware, a collaborative pizza ordering application configured to display on a display screen in communication with the data processing hardware a graphical user interface having an order initiation window and collaborative order window associated with at least one menu item order, the order initiation window having a list of at least one contact and at least one communication channel corresponding to each contact in the list of the at least one contact and a proposed order for a social order between the at least one contact and the primary customer, the proposed order including at least one menu item, the collaborative order window having a response summary of the at least one contact, wherein the collaborative pizza ordering application performs the following steps:
   displays, in the graphical user interface, the proposed order including the at least one menu item;
   receives, in the order initiation window, at least one contact selection input of the list of the at least one contact, the at least one contact selection input defining at least one secondary customer;
   receives, in the order initiation window, at least one communication channel selection input of the at least one communication channel, the at least one communication channel selection input defining the at least one communication channel to contact the at least one secondary customer;
   provides the proposed order for the social order to an order management engine having order management processing hardware, the order management processing hardware performing steps comprising:
      communicating, via the at least one communication channel defined by the at least one communication channel selection input, the proposed order for the social order to the at least one secondary customer;
      receiving, from the at least one secondary customer, at least one social response to the proposed order, the at least one social response defined by natural language;
      performing natural language processing on the at least one social response to determine at least one order preference for the at least one secondary customer, the at least one order preference including a modification to the at least one menu item; and
      updating the proposed order for the social order based on the at least one order preference determined for the at least one secondary customer;
   receives, from the order management engine, the updated proposed order and the at least one social response to the proposed order from the at least one secondary customer;
   displays, in real time, in the collaborative order window of the graphical user interface, the response summary corresponding to the at least one social response from the at least one secondary customer and the updated proposed order; and
   communicates, from the graphical user interface, the updated proposed order for the social order.

2. The method of claim 1, wherein the updated proposed order for the social order further comprises primary customer order information.

3. The method of claim 1, wherein the collaborative pizza ordering application is further configured to receive, in the graphical user interface, a notification corresponding to the at least one social response from the at least one secondary customer.

4. The method of claim 1, wherein the collaborative pizza ordering application is further configured to receive, in the order initiation window, a custom message from the primary customer.

5. The method of claim 4, wherein the updated proposed order for the social order further comprises the custom message from the primary customer.

6. The method of claim 1, wherein the collaborative pizza ordering application is further configured to:
receive, in the graphical user interface, at least one pizza order corresponding to the at least one menu item; and
communicate, from the graphical user interface, the at least one pizza order.

7. The method of claim 1, wherein the at least one menu item corresponds to a menu of a pizza retailer.

8. The method of claim 1, wherein the at least one menu item includes at least one pizza.

9. A user device comprising:
a display screen;
data processing hardware in communication with the display screen; and
memory hardware in communication with the data processing hardware, the memory hardware storing instructions that when executed on the data processing hardware cause the data processing hardware to perform operations comprising:
receiving primary customer order information of a primary customer; and
executing a collaborative pizza ordering application configured to display on the display screen in communication with the data processing hardware a graphical user interface having an order initiation window and collaborative order window associated with at least one menu item order, the order initiation window having a list of at least one contact and at least one communication channel corresponding to each contact in the list of the at least one contact and a proposed order for a social order between the at least one contact and the primary customer, the proposed order including at least one menu item, the collaborative order window having a response summary of the at least one contact, wherein the collaborative pizza ordering application is configured to:
display, in the graphical user interface, the proposed order including the at least one menu item;
receive, in the order initiation window, at least one contact selection input of the list of the at least one contact, the at least one contact selection input defining at least one secondary customer;
receive, in the order initiation window, at least one communication channel selection input of the at least one communication channel, the at least one communication channel selection input defining the at least one communication channel to contact the at least one secondary customer;
provide the proposed order for the social order to an order management engine having order management processing hardware, the order management processing hardware performing steps comprising:
communicating, via the at least one communication channel defined by the at least one communication channel selection input, the proposed order for the social order to the at least one secondary customer;
receiving, from the at least one secondary customer, at least one social response to the proposed order, the at least one social response defined by natural language;
performing natural language processing on the at least one social response to determine at least one order preference for the at least one secondary customer, the at least one order preference including a modification to the at least one menu item; and
updating the proposed order for the social order based on the at least one order preference determined for the at least one secondary customer;
receive, from the order management engine, the updated proposed order and the at least one social response to the proposed order from the at least one secondary customer;
display, in real time, in the collaborative order window of the graphical user interface, the response summary corresponding to the at least one social response from the at least one secondary customer and the updated proposed order; and
communicate, from the graphical user interface, the updated proposed order for the social order.

10. The device of claim 9, wherein the updated proposed order for the social order further comprises primary customer order information.

11. The device of claim 9, wherein the collaborative pizza ordering application is further configured to receive, in the graphical user interface, a notification corresponding to the at least one social response from the at least one secondary customer.

12. The device of claim 9, wherein the collaborative pizza ordering application is further configured to receive, in the order initiation window, a custom message from the primary customer.

13. The device of claim 12, wherein updated proposed order for the social order further comprises the custom message from the primary customer.

14. The device of claim 9, wherein the collaborative pizza ordering application is further configured to:
receive, in the graphical user interface, at least one pizza order corresponding to the at least one; and
communicate, from the graphical user interface, the at least one pizza order.

15. The device of claim 9, wherein the at least one menu item corresponds to a menu of a pizza retailer.

16. The device of claim 9, wherein the at least one menu item includes at least one pizza.

17. A method comprising:
executing, at data processing hardware, a collaborative pizza ordering application configured to display on a display screen in communication with the data processing hardware a graphical user interface having an order initiation window and collaborative order window associated with at least one menu item order, the order initiation window having a list of at least one contact and at least one communication channel corresponding to each contact in the list of the at least one contact, each contact defining at least one secondary customer;
receiving, in the order initiation window of the graphical user interface, a proposed order for a social order between the at least one secondary customer and a primary customer, the proposed order including at least one menu item, the social order defined by the at least one secondary customer and the at least one communication channel corresponding to the at least one secondary customer, the at least one secondary customer and the at least one communication channel identified by the primary customer;

displaying, in the collaborative order window of the graphical user interface, the proposed order including the at least one menu item;

providing the proposed order for the social order to an order management engine having order management processing hardware, the order management processing hardware performing steps comprising:
communicating, from the data processing hardware, the proposed order for the social order to the at least one secondary customer according to the at least one communication channel;
receiving, at the data processing hardware, at least one social response to the proposed order from the at least one secondary customer, the at least one social response defined by natural language;
performing, by the data processing hardware, natural language processing on the at least one social response to determine at least one order preference for the at least one secondary customer, the at least one order preference including a modification to the at least one menu item; and
updating, by the data processing hardware, the proposed order for the social order based on the at least one order preference determined for the at least one secondary customer;

receiving, from the order management engine, the updated proposed order for the social order;

displaying, in real time, in the collaborative order window of the graphical user interface, the updated proposed order for the social order; and communicating, from the data processing hardware, the updated proposed order for the social order.

18. The method of claim 17, wherein the proposed order for the social order further comprises a custom message from the primary customer.

19. The method of claim 17, wherein communicating the updated proposed order for the social order further comprises communicating each of the at least one social response.

20. The method of claim 17, further comprising storing the updated proposed order for the social order in memory hardware.

21. A system comprising:
data processing hardware; and
memory hardware in communication with the data processing hardware, the memory hardware storing instructions that when executed on the data processing hardware cause the data processing hardware to perform operations comprising:
executing, at the data processing hardware, a collaborative pizza ordering application configured to display on a display screen in communication with the data processing hardware a graphical user interface having an order initiation window and collaborative order window associated with at least one menu item order, the order initiation window having a list of at least one contact and at least one communication channel corresponding to each contact in the list of the at least one contact, each contact defining at least one secondary customer;
receiving, in the order initiation window of the graphical user interface, a proposed order for a social order between the at least one secondary customer and a primary customer, the proposed order including at least one menu item, the social order defined by the at least one secondary customer and the at least one communication channel corresponding to the at least one secondary customer, the at least one secondary customer and the at least one communication channel identified by the primary customer;
displaying, in the collaborative order window of the graphical user interface, the proposed order including the at least one menu item;
providing the proposed order for the social order to an order management engine having order management processing hardware, the order management processing hardware performing steps comprising:
communicating the proposed order for the social order to the at least one secondary customer according to the at least one communication channel;
receiving at least one social response to the proposed order from the at least one secondary customer, the at least one social response defined by natural language;
performing natural language processing on the at least one social response to determine at least one order preference for the at least one secondary customer, the at least one order preference including a modification to the at least one menu item; and
updating, by the data processing hardware, the proposed order for the social order based on the at least one order preference determined for the at least one secondary customer;
receiving, from the order management engine, the updated proposed order for the social order;
displaying, in real time, in the collaborative order window of the graphical user interface, the updated proposed order for the social order; and
communicating the updated proposed order for the social order.

22. The system of claim 21, wherein proposed order for the social order further comprises a custom message from the primary customer.

23. The system of claim 21, wherein the updated proposed order for the social order further comprises each of the at least one social response.

24. The system of claim 21, wherein the operations further comprise storing the updated proposed order for the social order in the memory hardware.

25. The system of claim 21, wherein the proposed order for the social order corresponds to a menu of a pizza retailer.

26. The system of claim 21, wherein the proposed order for the social order includes at least one pizza.

* * * * *